United States Patent Office 3,522,168
Patented July 28, 1970

3,522,168
CHELATING AGENTS IN BITUMINOUS
SAND WATER PROCESS
John A. Bichard, Port Edward, Ontario, and Clement W. Bowman, Edmonton, Alberta, Canada, assignors of thirty percent each to Cities Service Athabasca, Inc., a corporation of Delaware, Atlantic Richfield Company, a corporation of Pennsylvania, and Imperial Oil Limited, and ten percent to Royalite Oil Company, Ltd., both corporations of Canada
No Drawing. Filed July 11, 1966, Ser. No. 563,966
Int. Cl. C10g 1/00
U.S. Cl. 208—11                                       7 Claims

ABSTRACT OF THE DISCLOSURE

The invention concerns an improvement in water extraction processes for recovery of bitumen from bituminous sand. In such processes, bituminous sand is slurried with water and the resulting slurry introduced into a body of water so that bitumen floats to the top of the water in the form of a bituminous emulsion from which bitumen may then be recovered. Bituminous emulsion of improved quality can be obtained if the emulsion is formed in the presence of an added chelating agent which is soluble in the emulsion.

---

The present invention relates to the separation of bitumen from bituminous sands containing the same.

Bituminous sands, or tar sands as they are sometime called, are essentially aggregates of sand, clay, oil and water. In addition to these constituents, the bituminous sands normally contain varying amounts of polyvalent metal ions, including ferrous, ferric, magnesium and calcium, combined chemically with the bitumen or in mineral form. Large deposits of bituminous sands are found in various localities throughout the world. One of the most extensive deposits of bituminous sands occurs, for instance, in the Athabasca District of the Province of Alberta, Canada, and extends for many thousands of square miles in thicknesses ranging up to more than 200 feet.

Various procedures have heretofore been proposed for recovering the bitumen from bituminous sand by extraction with water to form a bitumen-water emulsion, sometimes referred to herein for simplicity as a "bituminous emulsion." The two best known procedures of this type are known as the "hot water method" and the "cold water method." In the former, the bituminous sand is jettisoned with steam and mulled with a small proportion of water at a temperature above about 125° F., e.g. 175° F. The resultant pulp is then dropped into a turbid stream of circulating water and carried through a separation cell maintained at an elevated temperature of about 180° F. In the separation cell, entrained or rising streams of air cause the bitumen to rise to the top of the cell in the form of a frothy bituminous emulsion which comprises bitumen, water and inorganic solid fines.

In accordance with the cold water extraction procedure, a diluent, such as kerosene, is added to the bituminous sand and the resultant mixture is charged to a ball mill wherein the lumps are broken up and the kerosene is thoroughly mixed with the bitumen. The mixture is then mixed with large amounts of water at a temperature of about 77° F. in a settling zone. Most of the sand settles out and a frothy bituminous emulsion is floated to the top in a manner similar to the above-noted hot water method.

Regardless of the particular water extraction procedure employed, separation of water from the bituminous emulsion is necessary for most ultimate uses of the bitumen. However, the separation of water from such emulsions is extremely difficult. It has been recognized that as the polyvalent metal ion content of the bituminous sand increases, separation of a bitumen-rich phase from the emulsion becomes increasingly more difficult. These ions apparently tend to increase the stability of the emulsion system.

The present invention provides an improved process for recovering bitumen by water extracting bituminous sands, whereby the deleterious effects of polyvalent metal ions on recovery of bitumen from a bituminous emulsion are negated. In accordance with a more specific object of the invention, a process is provided for producing a high quality bituminous emulsion wherein the ratios of water:bitumen and solids:bitumen are substantially lower than are obtained when the invention is not practiced. This high quality frothy emulsion may then be subjected to conventional recovery procedures to recover a bitumen-rich phase in high yield.

These and other objects and advantages of the invention as will become apparent to those skilled in the art from the following detailed description are realized by providing a bituminous emulsion containing an added chelating agent which is soluble in the emulsion, and subsequently recovering a bitumen-rich phase from the emulsion. The chelating agents used in the practice of the invention are those which complex with the polyvalent metal ions contained in bituminous sands, e.g. ferrous, ferric, calcium and maganesium. More specifically, the soluble chelating agents which we have found to be advantageous are the amino carboxylic acids and the hydroxy carboxylic acids. These chelating agents may be used in either their acid or salt forms.

The amino carboxylic acids, and especially the water soluble salts thereof, are the preferred additives. Suitable amino carboxylic acids are ethylene diaminetetraacetic acid (EDTA), nitrilotriacetic acid, di-(hydroxyethyl)-glycine, (hydroxethyl) ethylenediaminetriacetic acid, diethylenetriaminepentaacetic acid, etc. The tetrasodium salt of EDTA is especially effective for the purposes of the present process. Among the hydroxycarboxylic acids which may be used are gluconic acid, citric acid, tartaric acid, saccharic acid, etc.

The pH of the bituminous emulsion containing the aforementioned additives is an important consideration, and accordingly should be within the range of from about 4 to about 12. However, more desirable results are generally obtained by operating in the alkaline range, e.g. from about 7 to about 12.

It may be necessary to employ a basic compound in conjunction with the chelating agent in order to adjust the pH of the bituminous emulsion within the alkaline range, particularly when the bituminous sand is decidedly acidic. For this purpose, we prefer to use an alkali metal hydroxide such as sodium hydroxide.

In accordance with a preferred embodiment of the invention, the chelating agent is added to the bituminous sand prior to forming the frothy emulsion. For example, in the hot water extraction process, the amino carboxylic acid or hydroxy carboxylic acid may be mulled with water and the bituminous sand in the pulp forming step. The pulp may then be flooded with additional water to form an excellent quality frothy bituminous emulsion from which a bitumen-rich phase may be subsequently recovered in high yield. The emulsions so prepared are particularly characterized by lower water:bitumen ratios compared to emulsions prepared in the absence of the chelating agents employed in the practice of the present invention.

It is also within the scope of the invention to add the chelating agent to the bituminous emulsion during or following its formation, thereby reducing the stability of the emulsion system and aiding subsequent separation of the bitumen-rich phase therefrom.

If desired, the above procedures may be employed in combination. Thus, a portion of the chelating agent may be added in the pulp forming step to enable formation of a high quality emulsion of low solids and water contents, and another portion of the chelating agent may be added to the emulsion so formed to assist in the separation of a bitumen-rich phase therefrom.

The amount of chelating agent employed in the practice of the invention may vary widely depending on the polyvalent metal ion content of the bituminous sand as well as other factors. Although it is not possible to precisely state the amount of chelating agent which will be required for optimum results for each set of conditions, this amount may be readily ascertained by simple batch-scale experimental tests. It has been found that at least about 0.001 percent chelating agent by weight of the bitumen content of the emulsion, particularly at least about 0.5% by weight of the bitumen, is effective for the purposes of the invention. The upper limit on the amount of chelating agent added appears to be based solely upon economic considerations.

The present invention is not dependent on the particular process used to extract the bitumen from the sand. Thus, advantages are obtained in accordance with the invention by recovering a bitumen-rich phase from a bituminous emulsion containing an amino carboxylic acid or a hydroxy carboxylic acid, regardless of whether the bituminous sand is extracted by hot water or cold water techniques. Furthermore, the particular proportions of water and bitumen in the emulsion are also not critical to the invention. As noted hereinbefore when the chelating agent is added prior to the formation of the emulsion, e.g. in the pulping step, the resultant bitumen-rich frothy emulsion is characterized by relatively low water:bitumen ratios, for example below about 1.0.

A bitumen-rich phase may be recovered from the bituminous emulsion by any of the known techniques which do not form a part of the present invention. Thus, the emulsion may be filtered to remove solids and water therefrom. Alternatively, the emulsion may be allowed to settle, for example, at elevated pressures and temperatures, and a bitumen-rich phase recovered therefrom. Other procedures, known to the art, many also be used.

The invention will now be further described with reference to the following specific examples which illustrate the use of the present invention as applied to the hot water extraction process.

Example 1 illustrates a laboratory-scale conventional hot water extraction process not utilizing the present invention.

EXAMPLE 1

A brass pot containing 30 cc. of water at 180° F. was charged with 100 grams of an Alberta tar sand having the following properties:

TABLE 1

| | | |
|---|---|---|
| Water | wt. percent | 3.78 |
| Mineral matter | do | 84.01 |
| Crude bitumen | do | 12.21 |
| Iron | p.p.m. | 6400 |
| Calcium | p.p.m. | 2000 |
| Magnesium | p.p.m. | 1600 |

The tar sand and water were stirred (120 r.p.m.) for five (5) minutes, the temperature being maintained at a constant 180° F., to form a pulp. The resultant pulp was flooded with 50 cc. of water at 180° F. and aerated for ten (10) minutes at an air flow rate of 2 cu. ft./hr. A frothy emulsion was skimmed off the top of the pot and was analyzed for water, bitumen and solids contents.

The weight ratios of water:bitumen and solids:bitumen were calculated to be as follows:

TABLE 2

| | |
|---|---|
| Water:bitumen wt. ratio | 3.43 |
| Solids:bitumen wt. ratio | 1.48 |

The recovery of bitumen in the froth is determined by toluene extraction to be 65%; based on the weight of the bitumen contained in the tar sand.

The following example illustrates the present invention:

EXAMPLE 2

The above procedure was repeated except that 2.67 grams of the tetrasodium salt of ethylenediaminetetraacetic acid and 1 ml. of 2.5 NaOH solution were added to the tar sand during pulp formation. The frothy emulsion recovered after flooding and aerating the pulp was found to have a pH of 8.2. The relative proportions of solids, water and bitumen were as follows:

TABLE 3

| | |
|---|---|
| Water:bitumen wt. ratio | 0.46 |
| Solids:bitumen wt. ratio | 0.13 |

The bitumen recovery in the froth was determined to be 73% by weight based on the bitumen contained in the sand.

EXAMPLE 3

For the purpose of further illustrating the effectiveness of the invention, Example 2 was repeated except that the tetrasodium salt of ethylenediaminetetraacetic acid was not added. Thus, only sodium hydroxide was added during the pulp forming step. The frothy emulsion subsequently recovered was found to have a pH of 8.2 and contained the following relative proportions of solids, water and bitumen:

TABLE 4

| | |
|---|---|
| Water:bitumen wt. ratio | 3.38 |
| Solids:bitumen wt. ratio | 0.98 |

The recovery of bitumen in the froth was determined to be only 29% by weight based on the bitumen in the tar sand.

While the invention has been described above with respect to certain preferred embodiment thereof, it will be understood by those skilled in the art that various changes and modifications may be made without departing from the spirit and scope of the invention, and it is intended to cover all such changes and modifications in the appanded claims.

Therefore, we claim:

1. In a process for recovering bitumen by water extracting bituminous sands containing polyvalent metal ions to produce a bituminous emulsion comprising water, bitumen and polyvalent metal ions, and recovering a bitumen-rich phase therefrom, the improvement which comprises producing said emulsion in the presence of an added chelating agent which is soluble in said emulsion, wherein the pH of the emulsion is from about 7 to about 12.

2. Process as in claim 1 wherein said chelating agent is selected from the group consisting of amino carboxylic acids, hydroxy carboxylic acids and salts thereof.

3. Process as in claim 2 wherein said chelating agent is a water soluble salt of an amino carboxylic acid.

4. Process as in claim 3 wherein said chelating agent is the tetra sodium salt of ethylenediaminetetraacetic acid.

5. Process as in claim 2 wherein the emulsion further includes an alkali metal hydroxide in an amount sufficient to control the pH of the emulsion within the range of from about 7 to about 12.

6. Process as in claim 5 wherein said alkali metal hydroxide is sodium hydroxide.

7. Process as in claim 1 wherein said chelating agent is added to said bituminous sand prior to producing said bituminous emulsion.

(References on following page)

References Cited

UNITED STATES PATENTS

| | | | |
|---|---|---|---|
| 1,820,917 | 9/1931 | Langford et al. | 208—11 |
| 3,330,757 | 7/1967 | Bichard | 208—11 |
| 3,331,765 | 7/1967 | Canevari et al. | 208—11 |

FOREIGN PATENTS

| | | |
|---|---|---|
| 639,050 | 3/1962 | Canada. |
| 680,576 | 2/1965 | Canada. |

OTHER REFERENCES

The Development of the Alberta Bituminous Sands, by S. M. Blair, Edmonton, Alberta, Canada, 1950, Pages 12–13.

DANIEL E. WYMAN, Primary Examiner

P. E. KONOPKA, Assistant Examiner

U.S. Cl. X.R.

209—166